(12) United States Patent
Matsushita et al.

(10) Patent No.: US 9,212,274 B2
(45) Date of Patent: Dec. 15, 2015

(54) RUBBER COMPOSITION, RUBBER COMPOSITION FOR TIRE SIDE USE, CROSSLINKED RUBBER COMPOSITION AND TIRE

(75) Inventors: Junko Matsushita, Tachikawa (JP); Yasuo Horikawa, Kodaira (JP); Shojiro Kaita, Oizumi-machi (JP); Olivier Tardif, Wako-shi (FR)

(73) Assignee: BRIDGESTONE CORPORATION, Tokyo (JP)

( * ) Notice: Subject to any disclaimer, the term of this patent is extended or adjusted under 35 U.S.C. 154(b) by 190 days.

(21) Appl. No.: 13/985,449

(22) PCT Filed: Feb. 27, 2012

(86) PCT No.: PCT/JP2012/001325
§ 371 (c)(1),
(2), (4) Date: Aug. 14, 2013

(87) PCT Pub. No.: WO2012/117715
PCT Pub. Date: Sep. 7, 2012

(65) Prior Publication Data
US 2013/0324660 A1 Dec. 5, 2013

(30) Foreign Application Priority Data
Mar. 1, 2011 (JP) ................................ 2011-044514

(51) Int. Cl.
*C08L 9/00* (2006.01)
*B60C 1/00* (2006.01)
*C08L 7/00* (2006.01)
*C08L 23/08* (2006.01)
*C08L 21/00* (2006.01)

(52) U.S. Cl.
CPC ... *C08L 9/00* (2013.01); *B60C 1/00* (2013.01); *B60C 1/0016* (2013.04); *B60C 1/0025* (2013.04); *C08L 7/00* (2013.01); *C08L 21/00* (2013.01); *C08L 23/083* (2013.01)

(58) Field of Classification Search
CPC ...... C80L 23/083; C80L 23/145; C80L 23/16
See application file for complete search history.

(56) References Cited

U.S. PATENT DOCUMENTS 3,387,063 A * 6/1968 Bailey ........................... 525/211
4,645,793 A 2/1987 Von Hellens et al.
5,225,451 A * 7/1993 Rogers et al. ................... 521/94
6,218,469 B1 * 4/2001 Morizono et al. ............... 525/88
2003/0216526 A1 * 11/2003 Cecchin et al. ................. 526/86

FOREIGN PATENT DOCUMENTS

| CN | 1206026 A | 1/1999 |
| CN | 101274973 A | 10/2008 |
| EP | 1 038 696 A1 | 9/2000 |
| JP | 53-47446 A | 4/1978 |
| JP | 60-262842 A | 12/1985 |
| JP | 62-148543 A | 7/1987 |
| JP | 11-228743 A | 8/1999 |
| JP | 2000-63639 A | 2/2000 |
| JP | 2000-86857 A | 3/2000 |
| JP | 2000-154210 A | 6/2000 |
| JP | 2000-154279 A | 6/2000 |
| JP | 2004-224952 A | 8/2004 |
| JP | 2006-503141 A | 1/2006 |
| JP | 2006-249442 A | 9/2006 |
| JP | 2008-1742 A | 1/2008 |

OTHER PUBLICATIONS

Notification of Reasons for Refusal issued Oct. 28, 2014 in corresponding Japanese Patent Application No. 2013-502189 with translation.
Notification of First Office Action issued Aug. 19, 2014 in corresponding Chinese Patent Application No. 201280011187.4 with English translation.
Notification of Second Office Action issued Mar. 20, 2015 in corresponding Chinese Patent Application No. 201280011187.4 with translation.
Communication dated Oct. 2, 2015, issued by the European Patent Office in corresponding European Application No. 12751910.6.
Database WPI, Week 198607, Thomson Scientific, London, GB; AN 1986-045032, XP-002744857, 1 page total.
Database WPI, Week 197823, Thomson Scientific, London, GB; AN 1978-41399A, XP-002744858, 1 page total.

* cited by examiner

*Primary Examiner* — Wenwen Cai
(74) *Attorney, Agent, or Firm* — Sughrue Mion, PLLC

(57) ABSTRACT

The present invention provides a rubber composition that is used for manufacturing a rubber excellent in weather resistance, fracture resistance and crack growth resistance, and that contains a conjugated diene compound/non-conjugated olefin copolymer, a conjugate diene-based polymer and a non-conjugated diene compound/non-conjugated olefin copolymer, a rubber composition for tire side use using the rubber composition for tire sidewall members, a crosslinked rubber composition obtained by crosslinking the rubber composition, and a tire. The rubber composition includes: (A) a conjugated diene compound/non-conjugated olefin copolymer containing a conjugated diene compound-derived unit by at least 40 mol %; (B) a conjugated diene-based polymer; and (C) a non-conjugated diene compound/non-conjugated olefin copolymer containing an ethylene-propylene-diene rubber.

19 Claims, No Drawings

RUBBER COMPOSITION, RUBBER COMPOSITION FOR TIRE SIDE USE, CROSSLINKED RUBBER COMPOSITION AND TIRE

CROSS REFERENCE TO RELATED APPLICATIONS

This application is a National Stage of International Application No. PCT/JP2012/001325 filed Feb. 27, 2012, claiming priority based on Japanese Patent Application No. 2011-044514, filed Mar. 1, 2011, the contents of all of which are incorporated herein by reference in their entirety.

TECHNICAL FIELD

The present invention relates to a rubber composition, a rubber composition for tire side use, a crosslinked rubber composition and a tire, and in particular, to a rubber composition that is used for manufacturing a rubber excellent in weather resistance, fracture resistance and crack growth resistance, and that contains a conjugated diene compound/non-conjugated olefin copolymer, a conjugate diene-based polymer and a non-conjugated diene compound/non-conjugated olefin copolymer, a rubber composition for tire side use using the rubber composition for tire sidewall members, a crosslinked rubber composition obtained by crosslinking the rubber composition, and a tire using the rubber composition or the crosslinked rubber composition.

BACKGROUND ART

Additionally, in response to increasing social demands for energy and resource saving, there is an increasing need for a rubber material that is excellent in weather resistance and crack growth resistance to meet the requirements for improving durability of tires in order to reduce fuel consumption of automobiles. In addition, in view of the recent surge in price of butadiene, it is expected that the price of raw materials will even more dramatically rise in the future. As such, there is a need to make use of inexpensive olefin resource even in tire materials. To address this issue, some techniques have been proposed to improve weather resistance by blending an ethylene-propylene-diene rubber (EPDM) containing olefin as a principal component. These techniques, however, suffer from drawbacks, such as lower fracture resistance and lower crack growth resistance (see, for example, JP 2000-063639 A (PTL 1)).

In addition, applying a copolymer of a conjugated diene and a non-conjugated olefin to the compounded rubber results in fewer double bonds in the conjugated diene unit (conjugated diene compound-derived unit) in the copolymer as compared with conjugated polymers, and therefore, improved ozone resistance. In addition, the characteristics other than ozone resistance required when a rubber composition is applied to various applications (such as tires, conveyor belts or anti-vibration rubber) include good fracture resistance and good crack growth resistance. It is well known that coordination anionic polymerization using catalyst systems represented by a Ziegler-Natta catalyst allows for homopolymerization of olefins and dienes. However, it was difficult to provide efficient copolymerization of olefins and dienes using such polymerization systems.

To address this issue, for example, JP 2000-154210 A (PTL 2) discloses such a catalyst for polymerizing a conjugated diene that contains a transition metal compound of group IV of the periodic table having a cyclopentadiene ring structure, and also discloses α-olefins such as ethylene as monomers which can be copolymerized with the conjugated diene. However, PTL 2 does not provide a specific description of copolymerization of a conjugated diene compound and a non-conjugated olefin. Obviously, there is no description or suggestion that a rubber which is excellent in weather resistance, fracture resistance and crack growth resistance can be obtained by mixing: a conjugated diene compound/non-conjugated olefin copolymer containing a conjugated diene compound-derived unit by at least 40 mol %; a conjugated diene-based polymer; and a non-conjugated diene compound/non-conjugated olefin copolymer containing an ethylene-propylene-diene rubber.

For example, JP 2006-249442 A (PTL 3) discloses a catalyst for polymerizing olefins that consists of a transition metal compound such as a titanium compound and a co-catalyst, and also discloses a copolymer of an α-olefin and a conjugated diene compound. However, there is no description or suggestion in PTL 3 that a rubber which is excellent in weather resistance, fracture resistance and crack growth resistance can be obtained by mixing: a conjugated diene compound/non-conjugated olefin copolymer containing a conjugated diene compound-derived unit by at least 40 mol %; a conjugated diene-based polymer; and a non-conjugated diene compound/non-conjugated olefin copolymer containing an ethylene-propylene-diene rubber.

In addition, JP 2006-503141 A (PTL 4) discloses a copolymer of ethylene and butadiene that is obtained by synthesizing ethylene and butadiene as a starting material by means of a special organic metal complex as a catalytic component. However, there is no description or suggestion in PTL 4 that a rubber which is excellent in weather resistance, fracture resistance and crack growth resistance can be obtained by mixing: a conjugated diene compound/non-conjugated olefin copolymer containing a conjugated diene compound-derived unit by at least 40 mol %; a conjugated diene-based polymer; and a non-conjugated diene compound/non-conjugated olefin copolymer containing an ethylene-propylene-diene rubber.

In addition, JP 2000-086857 A (PTL 5) discloses a butadiene polymer having cis content of 92%, vinyl content of 6% and ethylene content of 3% or 9%. However, there is no description or suggestion in PTL 5 that a rubber which is excellent in weather resistance, fracture resistance and crack growth resistance can be obtained by mixing: a conjugated diene compound/non-conjugated olefin copolymer containing a conjugated diene compound-derived unit by at least 40 mol %; a conjugated diene-based polymer; and a non-conjugated diene compound/non-conjugated olefin copolymer containing an ethylene-propylene-diene rubber.

In addition, JP 2000-154279 (PTL 6) discloses a rubber composition including: a butadiene-ethylene block copolymer having a cis content of 92% and ethylene segments in an amount of 4.8 mass % of the total; polybutadiene having a cis content of 95.2% and a vinyl content of 2.5%; and carbon black N220. However, there is no description or suggestion in PTL 6 that a rubber which is excellent in weather resistance, fracture resistance and crack growth resistance can be obtained by mixing: a conjugated diene compound/non-conjugated olefin copolymer containing a conjugated diene compound-derived unit by at least 40 mol %; a conjugated diene-based polymer; and a non-conjugated diene compound/non-conjugated olefin copolymer containing an ethylene-propylene-diene rubber.

In addition, JP 11-228743 (PTL 7) discloses an olefin-rich, olefin-diene copolymer. However, there is no description or suggestion in PTL 7 that a rubber which is excellent in weather resistance, fracture resistance and crack growth resistance can be obtained by mixing: a conjugated diene compound/non-conjugated olefin copolymer containing a conjugated diene compound-derived unit by at least 40 mol %; a conjugated diene-based polymer; and a non-conjugated diene compound/non-conjugated olefin copolymer containing an ethylene-propylene-diene rubber.

CITATION LIST

Patent Literature

PTL 1: JP 2000-063639 A
PTL 2: JP 2000-154210 A
PTL 3: JP 2006-249442 A
PTL 4: JP 2006-503141 A
PTL 5: JP 2000-086857 A
PTL 6: JP 2000-154279 A
PTL 7: JP 11-228743 A

SUMMARY OF INVENTION

Technical Problem

In view of the above, an object of the present invention is to provide a rubber composition that is used for manufacturing a rubber excellent in weather resistance, fracture resistance and crack growth resistance, and that contains a conjugated diene compound/non-conjugated olefin copolymer, a conjugate diene-based polymer and a non-conjugated diene compound/non-conjugated olefin copolymer, a rubber composition for tire side use using the rubber composition for tire sidewall members, a crosslinked rubber composition obtained by crosslinking the rubber composition, and a tire using the rubber composition or the crosslinked rubber composition.

Solution to Problem

The inventors of the present invention have made intensive studies to achieve the above-described object and found that a rubber which is excellent in weather resistance, fracture resistance and crack growth resistance can be obtained by mixing: a conjugated diene compound/non-conjugated olefin copolymer containing a conjugated diene compound-derived unit by at least 40 mol %; a conjugated diene-based polymer; and a non-conjugated diene compound/non-conjugated olefin copolymer containing an ethylene-propylene-diene rubber. The present invention has been completed based on this finding.

That is, the rubber composition according to the present invention comprises: a conjugated diene compound/non-conjugated olefin copolymer (A) containing a conjugated diene compound-derived unit by at least 40 mol %; a conjugated diene-based polymer (B); and a non-conjugated diene compound/non-conjugated olefin copolymer (C) containing an ethylene-propylene-diene rubber.

In the rubber composition of the present invention, the conjugated diene compound/non-conjugated olefin copolymer (A) preferably contains an olefin component by 60 mol % or less.

In the rubber composition of the present invention, the non-conjugated diene compound/non-conjugated olefin copolymer (C) preferably contains the ethylene-propylene-diene rubber by at least 10 mol %.

Preferably, the rubber composition of the present invention further contains a reinforcing filler (D) by 10 parts by mass to 70 parts by mass per 100 parts by mass of the rubber component.

In the rubber composition of the present invention, the conjugated diene-based polymer (B) is preferably at least one selected from the group consisting of natural rubber, isoprene rubber, butadiene rubber and styrene-butadiene rubber.

In the rubber composition of the present invention, a mass ratio of the conjugated diene compound/non-conjugated olefin copolymer (A) to the conjugated diene-based polymer (B) to the non-conjugated diene compound/non-conjugated olefin copolymer (C) is preferably 10:80:10 to 60:10:30.

In the rubber composition of the present invention, the conjugated diene compound/non-conjugated olefin copolymer (A) preferably has a polystyrene-equivalent average-weight molecular weight of 10,000 to 10,000,000.

In the rubber composition of the present invention, the conjugated diene compound/non-conjugated olefin copolymer (A) preferably has a molecular weight distribution (Mw/Mn) of 10 or less.

In the rubber composition of the present invention, the non-conjugated olefin of the conjugated diene compound/non-conjugated olefin copolymer (A) preferably is an acyclic olefin.

In the rubber composition of the present invention, the non-conjugated olefin of the conjugated diene compound/non-conjugated olefin copolymer (A) preferably has 2 to 10 carbon atoms.

In the rubber composition of the present invention, the non-conjugated olefin of the conjugated diene compound/non-conjugated olefin copolymer (A) is preferably at least one selected from the group consisting of ethylene, propylene and 1-butene, and is more preferably ethylene.

In the rubber composition of the present invention, the conjugated diene compound of the conjugated diene compound/non-conjugated olefin copolymer (A) is preferably at least one selected from the group consisting of 1,3-butadiene and isoprene.

Preferably, the rubber composition of the present invention further includes a crosslinking agent by 0.1 parts by mass to 20 parts by mass per 100 parts by mass of the rubber component.

A rubber composition for tire side use according to the present invention uses the rubber composition of the present invention for tire sidewall members.

A crosslinked rubber composition according to the present invention is obtained by crosslinking the rubber composition of the present invention.

A tire according to the present invention uses the rubber composition of the present invention or the crosslinking rubber composition of the present invention, preferably for sidewall members thereof.

Advantageous Effect of Invention

The present invention may provide a rubber composition that is used for manufacturing a rubber excellent in weather resistance, fracture resistance and crack growth resistance, and that contains a conjugated diene compound/non-conjugated olefin copolymer, a conjugate diene-based polymer and a non-conjugated diene compound/non-conjugated olefin copolymer, a rubber composition for tire side use using the rubber composition for tire sidewall members, a crosslinked rubber composition obtained by crosslinking the rubber composition, and a tire using the rubber composition or the crosslinked rubber composition.

DESCRIPTION OF EMBODIMENTS

Rubber Composition

The present invention will be described in detail below. The rubber composition according to the present invention comprises at least: a conjugated diene compound/non-conjugated olefin copolymer (A) containing a conjugated diene compound-derived unit by at least 40 mol %; a conjugated diene-based polymer (B); and a non-conjugated diene compound/non-conjugated olefin copolymer (C) containing an ethylene-propylene-diene rubber, and optionally, further comprises: rubber components other than the above; a reinforcing filler such as carbon black; a crosslinking agent; and other components.

<Conjugated Diene Compound/Non-Conjugated Olefin Copolymer (A)>

The rubber composition of the present invention includes a conjugated diene compound/non-conjugated olefin copolymer (A), which contains a conjugated diene compound-derived unit by 40 mol %. The inclusion of the conjugated diene compound/non-conjugated olefin copolymer (A) allows the conjugated diene unit of the component (A) to improve compatibility with the component (B) and the non-conjugated olefin unit of the component (A) to improve compatibility with the non-conjugated diene compound/non-conjugated olefin copolymer (C), thereby yielding improved compatibility between the conjugated diene-based polymer (B) excellent in fracture resistance and crack growth resistance and the non-conjugated diene compound/non-conjugated olefin copolymer (C) containing the ethylene-propylene-diene rubber excellent in weather resistance, and balancing high level weather resistance, fracture resistance and crack growth resistance of the rubber composition. As used herein, the conjugated diene compound/non-conjugated olefin copolymer means a copolymer of a conjugated diene compound and a non-conjugated olefin, containing a non-conjugated olefin as a monomer unit component in the copolymer.

The content of the conjugated diene compound-derived unit is 40 mol % in the conjugated diene compound/non-conjugated olefin copolymer. The reason is that if the content is less than 40 mol %, the resulting copolymer may behave more like a plastic and present poor properties as an elastomer, leading to insufficient fracture resistance and crack resistance, as well as less compatibility between the conjugated diene-based polymer (B) and the non-conjugated diene compound/non-conjugated olefin copolymer (C) containing the ethylene-propylene-diene rubber, in which case it is not possible to obtain weather resistance, fracture resistance and crack growth resistance as desired. In order to obtain better weather resistance, fracture resistance and crack growth resistance, a copolymer that contains the conjugated diene compound-derived unit by 60 mol % or more is more preferable in terms of workability and fatigue resistance. As used herein, the conjugated diene compound-derived unit means such a unit that corresponds to a conjugated diene compound used as a monomer in the conjugated diene compound/non-conjugated olefin copolymer (A).

In addition, the content of the non-conjugated olefin-derived unit is preferably 60 mol % or less, more preferably 40 mol % or less, in terms of workability.

In addition, the cis-1,4 bond content of the conjugated diene compound-derived unit in the conjugated diene compound/non-conjugated olefin copolymer is not particularly limited, and may be selected as appropriate depending on the application thereof. The cis-1,4 bond content thereof is preferably 50 mol % or more.

The cis-1,4 bond content in the conjugated diene compound-derived unit of 50% or more allows the glass transition temperature (Tg) to be maintained low, which improves physical property such as crack growth resistance and wear resistance. Further, the cis 1,4 bond content of the conjugated diene compound-derived unit of more than 92% enables improvements in crack growth resistance, weather resistance and heat resistance, and of 95% or more may yield even more improved crack growth resistance, weather resistance and heat resistance.

As used herein, the cis-1,4 bond content corresponds to an amount in the conjugated diene compound-derived unit, rather than the ratio to the entire copolymer.

The conjugated diene compound/non-conjugated olefin copolymer (A) is free of a problem of molecular weight reduction, and the weight-average molecular weight (Mw) thereof is not particularly limited. However, in view of the application to polymer materials, a polystyrene-equivalent weight-average molecular weight (Mw) of the copolymer is preferably 10,000 to 10,000,000, more preferably 10,000 to 1,000,000, and even more preferably 50,000 to 600,000. Further, this copolymer preferably has a molecular weight distribution (Mw/Mn) of 10 or less, more preferably 5 or less, which is represented by a ratio of weight-average molecular weight (Mw) to number-average molecular weight (Mn). This is because a molecular weight distribution exceeding 10 leads to nonhomogeneous physical properties. Here, the average molecular weight and the molecular weight distribution can be determined by gel permeation chromatography (GPC) using polystyrene as a standard reference material.

It should be noted that the conjugated diene compound used as a monomer in the conjugated diene compound/non-conjugated olefin copolymer (A) preferably has 4 to 12 carbon atoms. Specific examples of the conjugated diene compound include: 1,3-butadiene; isoprene; 1,3-pentadiene; and 2,3-dimethyl butadiene, with 1,3-butadiene and isoprene being preferred. In addition, these conjugated diene compounds may be used alone or in a combination of two or more.

Any of the aforementioned specific examples of the conjugated diene compound can be used for preparing the aforementioned block copolymer and random copolymer in the same mechanism.

On the other hand, the non-conjugated olefin used as a monomer in the conjugated diene compound/non-conjugated olefin copolymer (A) is a non-conjugated olefin other than a conjugated diene compound, and the degree of freedom in designing it as an elastomer may be improved by means of its excellent heat resistance, by reducing the proportion of double bonds in the main chain of the copolymer, and by reducing its crystallinity. Further, the non-conjugated olefin is preferably an acyclic olefin, and the non-conjugated olefin preferably has 2 to 10 carbon atoms. Therefore, preferred examples of the aforementioned non-conjugated olefin include α-olefins such as: ethylene; propylene; 1-butene; 1-pentene; 1-hexene; 1-heptene; and 1-octene. Among these, ethylene, propylene, 1-butene are more preferred, and ethylene is particularly preferred. An α-olefin has a double bond at the cc position of an olefin, and therefor allows efficient copolymerization with a conjugated diene. These non-conjugated olefins may be used alone or in combination of two or more. As used herein, olefin refers to unsaturated aliphatic hydrocarbon, which is a compound containing at least one carbon-carbon double covalent bond.

In addition, since the copolymer of the present invention exhibits static crystallinity when containing a block sequence composed of monomeric units of the non-conjugated olefin, it may indicate the excellent mechanical properties, such as breaking strength.

Method of Manufacturing a Conjugated Diene Compound/Non-Conjugated Olefin Copolymer A method by which the conjugated diene compound/non-conjugated olefin copolymer may be manufactured will now be described in detail below. However, the manufacturing method described in detail below is merely an example.

The method of manufacturing the conjugated diene compound/non-conjugated olefin copolymer includes polymerizing a conjugated diene compound and a non-conjugated olefin in the presence of the following polymerization catalyst or polymerization catalyst composition. It should be noted that any polymerization method may be used, including solution polymerization, suspension polymerization, liquid phase bulk polymerization, emulsion polymerization, gas phase polymerization, solid phase polymerization, and so on. In addition, in the case of using a solvent for polymerization reaction, any solvent may be used that is inert to the polymerization reaction, including, for example, toluene, cyclohexane, n-hexane and mixtures thereof.

The above-described manufacturing method allows copolymerization of monomers, i.e., a conjugated diene compound and a non-conjugated olefin, as is the case with a normal method of manufacturing polymers by means of coordinated ionic polymerization catalysts, except that the above polymerization catalyst or polymerization catalyst composition is used.

<First Polymerization Catalyst Composition>

An example of the aforementioned polymerization catalyst composition includes a polymerization catalyst composition (hereinafter, also referred to as first polymerization catalyst composition) including at least one complex selected from a group consisting of: a metallocene complex represented by the following general formula (I); a metallocene complex represented by the following general formula (II); and a half metallocene cation complex represented by the following general formula (III):

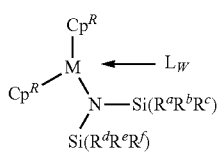
(I)

(in the formula (I), M represents a lanthanoid element, scandium, or yttrium; $Cp^R$ each independently represents an unsubstituted or substituted indenyl group; $R^a$ to $R^f$ each independently represent a hydrogen atom or an alkyl group having 1 to 3 carbon atoms; L represents a neutral Lewis base; and w represents an integer of 0 to 3.);

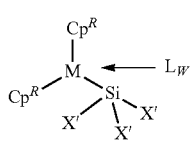
(II)

(In the formula (II), M represents a lanthanoid element, scandium, or yttrium; $Cp^R$ each independently represents an unsubstituted or substituted indenyl group; X' represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3.); and

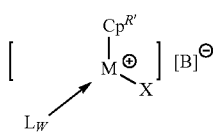
(III)

(In the formula (III), M represents a lanthanoid element, scandium, or yttrium; $Cp^{R'}$ represents an unsubstituted or substituted cyclopentadienyl, indenyl, fluorenyl group; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and [B]− represents a non-coordinating anion.). The first polymerization catalyst composition may further include another component such as a co-catalyst, which is contained in a general polymerization catalyst composition containing a metallocene complex. As used herein, the metallocene complex is a complex compound having one or more cyclopentadienyl groups or derivative of cyclopentadienyl groups bonded to the central metal. In particular, a metallocene complex may be referred to as a "half metallocene complex" when the number of cyclopentadienyl group or derivative thereof bonded to the central metal is one. In the polymerization system, the concentration of the complex contained in the first polymerization catalyst composition is preferably defined to fall within a range of 0.1 mol/L to 0.0001 mol/L.

In the metallocene complex represented by the general formulae (I) and (II) above, $Cp^R$ in the formulae represents an unsubstituted or substituted indenyl group. $Cp^R$ having an indenyl ring as a basic skeleton may be represented by $C_9H_{7-X}R_X$ or $C_9H_{11-X}R_X$. Here, X represents an integer of 0 to 7 or 0 to 11. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. Specific examples of the substituted indenyl group include 2-phenyl indenyl and 2-methyl indenyl group. Two $Cp^R$ in the general formulae (I) and (II) may be the same as or different from each other.

In the half metallocene cation complex represented by the general formula (III), $Cp^{R'}$ in the formula represents a substituted or unsubstituted cyclopentadienyl, indenyl, or fluorenyl group, with the substituted or unsubstituted indenyl group being preferred. $Cp^{R'}$ having a cyclopentadienyl ring as a basic skeleton is represented by $C_5H_{5-X}R_X$. Here, X represents an integer of 0 to 5. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group. $Cp^{R'}$ having a cyclopentadienyl ring as a basic skeleton is specifically exemplified as follows.

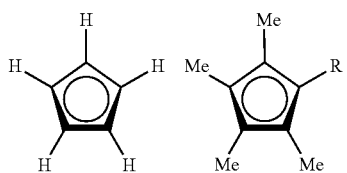

(In the formula, R represents a hydrogen atom, a methyl group, or an ethyl group.)

In the general formula (III), $Cp^{R'}$ having an indenyl ring as a basic skeleton is defined as the same as $Cp^R$ in the general formula (I), and preferred examples thereof are also the same as those of $Cp^R$ in the general formula (I).

In the general formula (III), $Cp^{R'}$ having the fluorenyl ring above as a basic skeleton may be represented by $C_{13}H_{9-X}R_X$ or $C_{13}H_{17-X}R_X$. Here, X represents an integer of 0 to 9 or 0 to 17. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group.

The central metal represented by M in the general formulae (I), (II), and (III) represents a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

The metallocene complex represented by the general formula (I) includes a silyl amide ligand represented by [—N(SiR$_3$)$_2$]. Groups represented by R(R$^a$ to R$^f$ in the general formula (I)) in the silyl amide ligand each independently represent a hydrogen atom or an alkyl group having 1 to 3 carbon atoms, and it is preferred that at least one of R$^a$ to R$^f$ represents a hydrogen atom. With at least one of R$^a$ to R$^f$ representing a hydrogen atom, the catalyst can be synthesized with ease, and the bulkiness around silicon can be reduced, to thereby allow the non-conjugated olefin to be easily introduced. Based on the same objective, it is further preferred that at least one of R$^a$ to R$^c$ represents a hydrogen atom, and at least one of R$^d$ to R$^f$ represents a hydrogen atom. Additionally, a methyl group is preferred as the alkyl group.

The metallocene complex represented by the general formula (II) includes a silyl ligand represented by [—SiX'$_3$]. X' in the silyl ligand represented by [—SiX'$_3$] is a group defined as the same as X in the general formula (III) described below, and preferred examples thereof are also the same as those of X in the general formula (III).

In the general formula (III), X represents a group selected from a group consisting of a hydrogen atom, a halogen atom, an alkoxide group, a thiolate group, an amide group, a silyl group, and a hydrocarbon group having 1 to 20 carbon atoms. In the general formula (III), the alkoxide group may be any one of aliphatic alkoxy groups such as a methoxy group, an ethoxy group, a propoxy group, an n-butoxy group, an isobutoxy group, a sec-butoxy group, and a tert-butoxy group; and aryl oxide groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group. Among these, preferred is the 2,6-di-tert-butylphenoxy group.

In the general formula (III), the thiolate group represented by X may be any one of: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group, with the 2,4,6-triisopropylthiophenoxy group being preferred.

In the general formula (III), the amide group represented by X may be any one of: aliphatic amide groups such as a dimethyl amide group, a diethyl amide group, and a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tri-tert-butylphenyl amide group; and bistrialkylsilyl amide groups such as a bistrimethylsilyl amide group, with the bistrimethylsilyl amide group being preferred.

In the general formula (III), the silyl group represented by X may be any one of a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group, with the tris(trimethylsilyl)silyl group being preferred.

In the general formula (III), the halogen atom represented by X may be any one of a fluorine atom, a chlorine atom, a bromine atom, and an iodine atom, with the chlorine atom and the iodine atom being preferred. Specific examples of the hydrocarbon group having 1 to 20 carbon atoms include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bistrimethylsilylmethyl group each containing a silicon atom, with the methyl group, the ethyl group, the isobutyl group, the trimethylsilylmethyl group, and the like being preferred.

In the general formula (III), the bistrimethylsilyl amide group or the hydrocarbon group having 1 to 20 carbon atoms is preferred as X.

In the general formula (III), examples of the non-coordinating anion represented by [B]⁻ include tetravalent boron anions. Specific examples of the tetravalent boron anions may include: a tetraphenyl borate, a tetrakis(monofluorophenyl)borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (tripheyl, pentafluorophenyl)borate, a [tris(pentafluorophenyl), phenyl]borate, and a tridecahydride-7,8-dicarbaundecaborate, with the tetrakis(pentafluorophenyl)borate being preferred.

The metallocene complexes represented by the general formulae (I) and (II) and the half metallocene cation complex represented by the general formula (III) may include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same or different from each other.

The metallocene complexes represented by the general formulae (I) to (II), and the half metallocene cation complex represented by the general formula (III) may be each present as a monomer or as a dimer or a multimer having more monomers.

The metallocene complex represented by the general formula (I) can be obtained by, for example, subjecting a lanthanoid trishalide, a scandium trishalide, or a yttrium trishalide to reaction in a solvent with a salt of indenyl (for example, a potassium salt or a lithium salt) and a salt of bis(trialkylsilyl)amide (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that dissolves the raw material and products being preferred, and for example, toluene may be used. In the following, a reaction example for obtaining the complex represented by the general formula (I) is described.

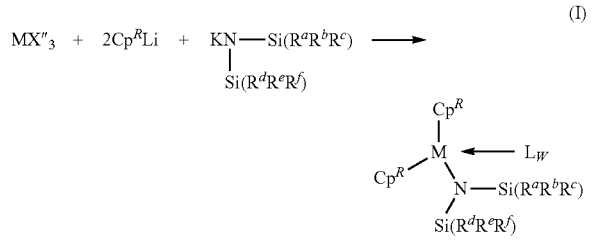

(In the Formula, X" represents a halide.)

The metallocene complex represented by the general formula (II) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that dissolves the raw material and products being preferred, and for example, toluene may be used. In the following, a reaction example for obtaining the complex represented by the general formula (II) is described.

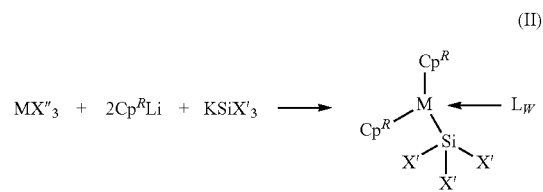

(In the Formula, X" represents a halide.)

The half metallocene cation complex represented by the general formula (III) can be obtained by, for example, the following reaction:

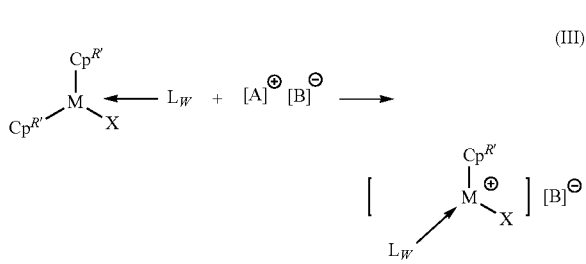

In the general formula (IV) representing a compound: M represents a lanthanoid element, scandium, or yttrium; $Cp^{R'}$ each independently represents an unsubstituted or substituted cyclopentadienyl, indenyl, or fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3. Further, in the general formula $[A]^+[B]^-$ representing an ionic compound, $[A]^+$ represents a cation; and $[B]^-$ represents a non-coordinating anion.

Examples of the cation represented by $[A]^+$ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation, and specific examples of the tri(substituted phenyl)carbonium cation include a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Of those cations, the N,N-dialkylanilinium cations or the carbonium cations are preferred, and the N,N-dialkylanilinium cations are particularly preferred.

The ionic compound represented by the general formula $[A]^+[B]^-$ used in the aforementioned reaction may preferably be a compound obtained by combining any one selected from the non-coordinating anions described above and any one selected from the cations described above. Specific examples thereof preferably include a N,N-dimethylanilinium tetrakis(pentafluorophenyl)borate and a triphenylcarbonium tetrakis(pentafluorophenyl)borate. The ionic compound represented by the general formula $[A]^+[B]^-$ is added in an amount of preferably 0.1-fold mol to 10-fold mol and more preferably about 1-fold mol, with respect to the metallocene complex. When the half metallocene cation complex represented by the general formula (III) is used in polymerization reaction, the half metallocene cation complex represented by the general formula (III) may be directly supplied to the polymerization system, or alternatively, the compound represented by the general formula (IV) used in the reaction and the ionic compound represented by the general formula $[A]^+[B]^-$ may be separately supplied to the polymerization system, to thereby form the half metallocene cation complex represented by the general formula (III) in the reaction system. In addition, the half metallocene cation complex represented by the general formula (III) may be formed in the reaction system by using the metallocene complex represented by the general formula (I) or (II) and the ionic compound represented by the general formula $[A]^+[B]^-$ in combination.

Structures of the metallocene complex represented by the general formula (I) or (II) and of the half metallocene cation complex represented by the general formula (III) is preferably determined by X-ray crystallography.

The co-catalyst that can be contained in the first polymerization catalyst composition may be arbitrarily selected from components used as the co-catalyst for the general polymerization catalyst composition containing a general metallocene complex. Preferred examples of the co-catalyst include aluminoxanes, organic aluminum compounds, and the above ionic compounds. These co-catalysts may be contained alone or in combination of two or more.

The aluminoxane is preferably an alkyl aluminoxane, examples of which include methyl aluminoxane (MAO) and modified methyl aluminoxane. In addition, preferred examples of the modified methyl aluminoxane include MMAO-3A (manufactured by Tosoh Finechem Corporation). The content of the aluminoxane in the first polymerization catalyst composition is preferably about 10 to 1,000, more preferably about 100, at an element ratio (Al/M) of the aluminum element Al of the aluminoxane to the central metal element M in the metallocene complex.

On the other hand, preferred examples of the organic aluminum compounds may include an organic aluminum compound represented by a general formula AlRR'R" (where R and R' each independently represent a hydrocarbon group of C1 to C10 or a hydrogen atom, and R" is a hydrocarbon group of C1 to C10). Examples of the organic aluminum compound include a trialkyl aluminum, a dialkyl aluminum chloride, an alkyl aluminum dichloride, and a dialkyl aluminum hydride; among these, preferred is the trialkyl aluminum. In addition, examples of the trialkyl aluminum include triethyl aluminum and triisobutyl aluminum. The content of the organic aluminum compound in the first polymerization catalyst composition is preferably 1-fold mol to 50-fold mol and more preferably about 10-fold mol, with respect to the metallocene complex.

In the first polymerization catalyst composition, the metallocene complex represented by the general formulae (I) and (II) and the half metallocene cation complex represented by the general formula (III) may be combined with an appropriate co-catalyst, to thereby increase the cis-1,4 bond content and the molecular weight of a copolymer to be obtained.

<Second Polymerization Catalyst Composition>

Another preferred example of the aforementioned polymerization catalyst composition may include: a polymerization catalyst composition (hereinafter, also referred to as second polymerization catalyst composition) containing: component (a): a rare earth element compound or a reactant of a rare earth element compound and a Lewis base, with no bond formed between the rare earth element and carbon; component (b): at least one selected from the group consisting of: an ionic compound (b-1) composed of a non-coordinating anion and a cation; an aluminoxane (b-2); and at least one kind of halogen compound (b-3) from among a Lewis acid, a complex compound of a metal halide and a Lewis base, and an organic compound containing active halogen. Further, if the second polymerization catalyst composition contains at least one kind of the ionic compound (b-1) and the halogen compound (b-3), the polymerization catalyst composition further contains: component (C): an organic metal compound represented by the following general formula (X):

$$YR^1_a R^2_b R^3_c \qquad (X)$$

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table).

The above-described second polymerization catalyst composition used in the method of manufacturing the copolymer is required to contain the above-described components (a) and (b), and if the polymerization catalyst composition contains at least one of the above-described ionic compound (b-1) and halogen compound (b-3), then it is further required to contain an organometallic compound represented by the following formula: component (c) represented by the following general formula (X):

$$YR^1_a R^2_b R^3_c \qquad (X)$$

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table). The ionic compound (b-1) and the halogen compound (b-3) do not have carbon atoms to be fed to the component (a), and thus the component (c) becomes necessary as a source of feeding carbon to the component (a). It should be noted that the polymerization catalyst composition still may include the component (c) even if the polymerization catalyst composition includes the aluminoxane (b-2). Further, the second polymerization catalyst composition may further include another component such as a co-catalyst, which is contained in a general rare earth element compound-based polymerization catalyst composition. In the polymerization system, the concentration of the component (a) contained in the second polymerization catalyst composition is preferably defined to fall within a range of 0.1 mol/L to 0.0001 mol/L.

The component (a) contained in the second polymerization catalyst composition is a rare earth element compound or a reactant of the rare earth element compound and a Lewis base. Here, a rare earth element compound or a reactant of the rare earth element compound and a Lewis base do not have a direct bond of the rare earth element and carbon. When the rare earth element compound or a reactant thereof does not have a direct bond of a rare earth element and carbon, the resulting compound is stable and easy to handle. As used herein, the rare earth element compound refers to a compound containing a lanthanoid element, scandium, or yttrium. The lanthanoid elements include elements with atomic numbers 57 to 71 of the periodic table. Specific examples of the lanthanoid element include lanthanum, cerium, praseodymium, neodymium, promethium, samarium, europium, gadolinium, terbium, dysprosium, holmium, erbio, tulio, itterbio, and lutezio. These components (a) may be contained alone or in combination of two or more.

The rare earth element compound is preferably composed of a rare earth metal of a bivalent or trivalent salt or of a complex compound, and further preferably a rare earth element compound containing at least one ligand selected from a hydrogen atom, a halogen atom, and an organic compound residue. Further, the rare earth element compound or the reactant of the rare earth element compound and the Lewis base is represented by the following general formula (XI) or (XII):

$$M^{11}X^{11}{}_2 \cdot L^{11}{}_w \qquad (XI)$$

$$M^{11}X^{11}{}_3 \cdot L^{11}{}_w \qquad (XII)$$

(where: $M^{11}$ represents a lanthanoid element, scandium, or yttrium; $X^{11}$ each independently represent a hydrogen atom, a halogen atom, an alkoxy group, a thiolate group, an amide group, a silyl group, an aldehyde residue, a ketone residue, a carboxylic acid residue, a thiocarboxylic acid residue, or a phosphorous compound residue; $L^{11}$ represents a Lewis base; and w represents 0 to 3).

Specific examples of a group (ligand) to form a bond to the rare earth element of the rare earth element compound include: a hydrogen atom; aliphatic alkoxy groups such as a methoxy group, an ethoxy group, a propoxy group, an n-butoxy group, an isobutoxy group, a sec-butoxy group, and a tert-butoxy group; a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bistrialkylsilyl amide groups such as a bistrimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetylacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thiocarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid(butyl)(2-ethylhexyl), a phosphoric acid(1-methylheptyl)(2-ethylhexyl), and a phosphoric acid (2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, and a phosphonic acid mono-p-nonylphenyl; residues of phosphinic acid such as a dibutylphosphinic acid, a bis(2-ethylhexyl)phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl) phosphinic acid, (2-ethylhexyl)(1-methylheptyl)phosphinic acid, an (2-ethylhexyl)(p-nonylphenyl) phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid. These ligands may be used alone or in combination of two or more.

As to the component (a) used in the second polymerization catalyst composition, examples of the Lewis base to react with the rare earth element compound may include: tetrahydrofuran; diethyl ether; dimethylaniline; trimethylphosphine; lithium chloride, neutral olefins, and neutral diolefins. Here, in the case where the rare earth element compound reacts with a plurality of Lewis bases (in the case where w is 2 or 3 in the formulae (XI) and (XII)), the Lewis base $L^{11}$ in each formula may be the same as or different from each other.

The component (b) contained in the second polymerization catalyst composition is at least one compound selected from the group consisting of: an ionic compound (b-1); an aluminoxane (b-2); and a halogen compound (b-3). The total content of the component (b) contained in the second polymerization catalyst composition is preferably defined to fall within a range of 0.1-fold mol to 50-fold mol, with respect to the component (a).

The ionic compound represented by (b-1) is formed of non-coordinating anion and cation, and an example thereof includes: an ionic compound that reacts with the rare earth element compound as the component (a) or with the reactant resulting from Lewis base and the rare earth element compound, so as to form a cationic transition metal compound. Here, examples of the non-coordinating anion include: tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (tripheyl, pentafluorophenyl)borate, [tris(pentafluorophenyl), phenyl]borate, and tridecahydride-7,8-dicarbaundecaborate. Meanwhile, examples of the cation may include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a tri(substituted phenyl)carbonium cation, and more specific examples of the tri(substituted phenyl)carbonium cation include a tri(methylphenyl)carbonium cation and a tri(dimethylphenyl)carbonium cation. Examples of the ammonium cation include: trialkylammonium cations such as a trimethylammonium cation, a triethylammonium cation, a tripropylammonium cation, and a tributylammonium cation (such as a tri(n-butyl)ammonium cation); N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation. Therefore, the ionic compound may preferably be a compound obtained by combining any one selected from the non-coordinating anions described above and any one selected from the cations described above. Specific examples thereof preferably include a N,N-dimethylanilinium tetrakis(pentafluorophenyl)borate and a triphenylcarbonium tetrakis(pentafluorophenyl)borate. These ionic compounds may be contained alone or in combination of two or more. The content of the ionic compound in the second polymerization catalyst composition is preferably 0.1-fold mol to 10-fold mol, and more preferably about 1-fold mol, with respect to the component (a).

The aluminoxane represented by (b-2) is a compound obtained by contacting an organic aluminum compound with a condensation agent, and examples thereof include: a chain type aluminoxane or a cyclic aluminoxane, both having a repeating unit represented by the general formula (—Al(R')O—) (where R' is a hydrocarbon group having 1 to 10 carbon atoms and may be partly substituted with halogen atom and/or alkoxy group, and the polymerization degree of the repeating unit is preferably at least 5, more preferably at least 10). Here, specific examples of R' include a methyl group, an ethyl group, a propyl group, and isobutyl group, with the methyl group being preferred. Further, examples of the organic aluminum compound used as a raw material of the aluminoxane may include: trialkyl aluminums such as trimethyl aluminum, triethyl aluminum, triisobutyl aluminum and the like; and mixtures thereof, with the trimethyl aluminum being particularly preferred. For example, an aluminoxane obtained using, as a raw material, a mixture of trimethyl aluminum and tributyl aluminum can be suitably used. The content of aluminoxane in the second polymerization catalyst composition is preferably about 10 to 1,000 at an element ratio (Al/M) of the aluminum element Al of the aluminoxane to the rare earth element M forming the component (a).

The halogen compound represented by (b-3) includes at least one of: a Lewis acid; a complex compound of a metal halide and a Lewis base; and an organic compound containing active halogen, and is capable of reacting with, for example, the rare earth element compound as the component (a) or with the reactant resulting from Lewis base and the rare earth element compound, so as to form a compound, such as a cationic transition metal compound, a halogenated transition metal compound or a compound with a charge-deficient transition metal center. The content of the halogen compound in the second polymerization catalyst composition is preferably 1-fold mol to 5-fold mol, with respect to the component (a).

Examples of the Lewis acid may include: a boron-containing halogen compound such as $B(C_6F_5)_3$ and an aluminum-containing halogen compound such as $Al(C_6F_5)_3$, and may also include a halogen compound containing an element of Group III, Group IV, Group V, Group VI, and Group VIII of the periodic table. Preferred examples thereof include an aluminum halide or an organometallic halide. Preferred examples of the halogen element include chlorine and bromine. Specific examples of the Lewis acid include: a methyl aluminum dibromide; a methyl aluminum dichloride; an ethyl aluminum dibromide; an ethyl aluminum dichloride; a butyl aluminum dibromide; a butyl aluminum dichloride; a dimethyl aluminum bromide; a dimethyl aluminum chloride; a diethyl aluminum bromide; a diethyl aluminum chloride; a dibutyl aluminum bromide; a dibutyl aluminum chloride; a methyl aluminum sesquibromide; a methyl aluminum sesquichloride; a ethyl aluminum sesquibromide; an ethyl aluminum sesquichloride; a dibutyltin dichloride; an aluminum tribromide; an antimony trichloride; an antimony pentachloride; a phosphorus trichloride; a phosphorus pentachloride; a tin tetrachloride; a titanium tetrachloride; and tungsten hexachloride. Among these, particularly preferred are the diethyl aluminum chloride, the ethyl aluminum sesquichloride, the ethyl aluminum dichloride, the diethyl aluminum bromide, the ethyl aluminum sesquibromide, and the ethyl aluminum dibromide.

Preferred examples of the metal halide forming a complex compound of the metal halide and a Lewis base include: a beryllium chloride, a beryllium bromide; a beryllium iodide; a magnesium chloride; a magnesium bromide; a magnesium iodide; a calcium chloride; a calcium bromide; a calcium iodide; a barium chloride; a barium bromide; a barium iodide; a zinc chloride; a zinc bromide; a zinc iodide; a cadmium chloride; a cadmium bromide; a cadmium iodide; a mercury chloride; a mercury bromide; a mercury iodide; a manganese chloride; a manganese bromide; a manganese iodide; a rhenium chloride; a rhenium bromide; a rhenium iodide; a copper chloride; a copper iodide; a silver chloride; a silver bromide; a silver iodide; a gold chloride; a gold iodide; and a gold bromide. Among these, particularly preferred are the magnesium chloride, the calcium chloride, the barium chloride, the manganese chloride, the zinc chloride, and the copper chloride being preferred, and the magnesium chloride, the manganese chloride, the zinc chloride, and the copper chloride.

Preferred examples of the Lewis base forming a complex compound of the metal halide and the Lewis base include: a phosphorus compound; a carbonyl compound; a nitrogen compound; an ether compound; and an alcohol. Specific examples thereof include: a tributyl phosphate; a tri-2-ethylhexyl phosphate; a triphenyl phosphate; a tricresyl phosphate; a triethylphosphine; a tributylphosphine; a triphenylphosphine; a diethylphosphinoethane; a diphenyl phosphino ethane; an acetylacetone; a benzoylacetone; a propionitrileacetone; a valerylacetone; an ethylacetylacetone; a methyl acetoacetate; an ethyl acetoacetate; a phenyl acetoacetate; a dimethyl malonate; a diethyl malonate; a diphenyl malonate; an acetic acid; an octanoic acid; a 2-ethylhexoic acid; an oleic acid; a stearic acid; a benzoic acid; a naphthenic acid; a versatic acid; a triethylamine; a N,N-dimethylacetamide; a tetrahydrofuran; a diphenyl ether; a 2-ethylhexyl alcohol; an oleyl alcohol; stearyl alcohol; a phenol; a benzyl alcohol; a 1-decanol; and a lauryl alcohol. Among these, preferred are the tri-2-ethylhexyl phosphate, the tricresyl phosphate; the acetylacetone, the 2-ethylhexoic acid, the versatic acid, the 2-ethylhexyl alcohol; the 1-decanol; and the lauryl alcohol.

The Lewis base is subjected to reaction with the metal halide in the proportion of 0.01 mol to 30 mol, preferably 0.5 mol to 10 mol, per 1 mol of the metal halide. The use of the reactant obtained from the reaction of the Lewis base can reduce residual metal in the polymer.

An example of the organic compound containing active halogen includes benzyl chloride.

The component (c) contained in the second polymerization catalyst composition is an organic compound represented by the general formula (X):

$$YR^1_aR^2_bR^3_c \quad (X)$$

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table), and preferably is an organic compound represented by the general formula (Xa):

$$AlR^1R^2R^3 \quad (Xa)$$

(where $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above). Examples of the organic aluminum compound in the formula (X) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. The organic aluminum compounds as the component (c) may be contained alone or in combination of two or more. The content of the organic aluminum compound in the second polymerization catalyst composition is preferably 1-fold mol to 50-fold mol, and more preferably about 10-fold mol, with respect to the component (a).

<Polymerization Catalyst and Third Polymerization Catalyst Composition>

Examples of the polymerization catalyst include: a metallocene-based composite catalyst which is used for polymerization with the conjugated diene compound and the non-conjugated olefin and is represented by the following formula (A):

$$R_aMX_bQY_b \quad (A)$$

(where R each independently represents an unsubstituted or substituted indenyl group, the R being coordinated with M; M represents a lanthanoid element, scandium, or yttrium; X each independently represents a hydrocarbon group having 1 to 20 carbon atoms, the X being μ-coordinated with M and Q; Q represents a Group 13 element in the periodic table; Y each independently represents a hydrocarbon group having 1 to 20 carbon atoms or a hydrogen atom, the Y being coordinated with Q; and a and b each are 2).

Preferred examples of the above-described metallocene-based composite catalyst include a metallocene-based composite catalyst represented by the following formula (XV):

(where $M^1$ represents a lanthanoid element, scandium, or yttrium; $Cp^R$ each independently represents an unsubstituted or substituted indenyl group; $R^A$ to $R^B$ each independently represent a hydrocarbon group having 1 to 20 carbon atoms, $R^A$ and $R^B$ being μ-coordinated with $M^1$ and Al; and $R^C$ and $R^D$ each independently represent a hydrocarbon group having 1 to 20 carbon atoms or a hydrogen atom).

In addition, the above-described third polymerization catalyst composition contains the above-described metallocene-based composite catalyst and a boron anion.

<Metallocene-Based Composite Catalyst>

The above-described metallocene-based composite catalyst will now be described in detail below. The above-described metallocene-based composite catalyst has a rare earth element of lanthanoid element, scandium or yttrium and an element in group 13 of the periodic table, and is represented by the following formula (A):

$$R_aMX_bQY_b \quad (A)$$

(where R each independently represents an unsubstituted or substituted indenyl group, the R being coordinated with M; M represents a lanthanoid element, scandium, or yttrium; X each independently represents a hydrocarbon group having 1 to 20 carbon atoms, the X being μ-coordinated with M and Q; Q represents a Group 13 element in the periodic table; Y each independently represents a hydrocarbon group having 1 to 20 carbon atoms or a hydrogen atom, the Y being coordinated with Q; and a and b each are 2). The above-described metallocene-based polymerization catalyst allows for manufacture of a copolymer of a conjugated diene compound and a non-conjugated olefin. In addition, the use of the above-described metallocene-based composite catalyst, such as the one combined with an aluminum-based catalyst, can reduce or eliminate the amount of alkyl aluminum to be used in the step of synthesizing a copolymer. Meanwhile, the use of a conventional catalyst system requires a large amount of alkyl aluminum to be used in synthesizing a copolymer. For example, a conventional catalyst system requires alkyl aluminum of at least 10 equivalents relative to a metal catalyst, whereas the above-described metallocene-based composite catalyst of the present invention can exhibit an excellent catalytic effect through the addition of alkyl aluminum of only about 5 equivalents.

In the metallocene-based composite catalyst, the metal represented by M in the formula (A) is a lanthanoid element, scandium, or yttrium. The lanthanoid elements include 15 elements with atomic numbers 57 to 71, and may be any one of them. Preferred examples of the metal represented by M include samarium (Sm), neodymium (Nd), praseodymium (Pr), gadolinium (Gd), cerium (Ce), holmium (Ho), scandium (Sc), and yttrium (Y).

In the formula (A), R each independently represents an unsubstituted or substituted indenyl, the R being coordinated with the metal M. Specific examples of the substituted indenyl group include a 1,2,3-trimethyl indenyl group, a heptamethyl indenyl group, and a 1,2,4,5,6,7-hexamethyl indenyl group.

In the formula (A), Q represents a Group 13 element in the periodic table. Specific examples thereof include: boron, aluminum, gallium, indium, and thallium.

In the formula (A), X each independently represents a hydrocarbon group having 1 to 20 carbon atoms, the X being µ-coordinated with M and Q. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The µ-coordination refers to a state of coordination which forms a crosslinked structure.

In the formula (A), Y each independently represents a hydrocarbon group having 1 to 20 carbon atoms or a hydrogen atom, the Y being coordinated with Q. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the formula (XV) above, the metal represented by $M^1$ is a lanthanoid element, scandium, or yttrium. The lanthanoid elements include 15 elements with atomic numbers 57 to 71, and may be any one of them. Preferred examples of the metal represented by $M^1$ include samarium (Sm), neodymium (Nd), praseodymium (Pr), gadolinium (Gd), cerium (Ce), holmium (Ho), scandium (Sc), and yttrium (Y).

In the formula (XV), $Cp^R$ represents an unsubstituted or substituted indenyl. $Cp^R$ having an indenyl ring as a basic skeleton may be represented by $C_9H_{7-X}R_X$ or $C_9H_{11-X}R_X$. Here, X represents an integer of 0 to 7 or 0 to 11. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group. Specific examples of the substituted indenyl group include 2-phenyl indenyl and 2-methyl indenyl group. Two $Cp^R$ in the formula (XV) may be the same as or different from each other.

In the formula (XV), $R^A$ and $R^B$ each independently represent a hydrocarbon group having 1 to 20 carbon atoms, the $R^A$ and $R^B$ being µ-coordinated with $M^1$ and Al. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The µ-coordination refers to a state of coordination which forms a crosslinked structure.

In the formula (XV), $R^C$ and $R^D$ each independently represent a hydrocarbon group having 1 to 20 carbon atoms or a hydrogen atom. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

The metallocene-based composite catalyst can be obtained by, for example, reacting with an organic aluminum compound represented by $AlR^KR^LR^M$ in a solvent, the metallocene complex represented by the following formula (XVI):

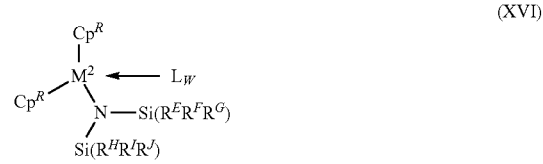

(XVI)

(where, $M^2$ represents a lanthanoid element, scandium, or yttrium; $Cp^R$ each independently represents an unsubstituted or substituted indenyl group; $R^E$ to $R^J$ each independently represent an alkyl group having 1 to 3 carbon atoms or a hydrogen atom; L represents a neutral Lewis base; and w represents an integer of 0 to 3.). The reaction temperature only needs to be set to about room temperature, and thus the complex can be manufactured in mild conditions. In addition, reaction time is arbitrary, but about several hours to several tens of hours. The reaction solvent is not particularly limited, and any solvent including, for example, toluene and hexane, which are capable of dissolving the raw material and products can be preferably used. The structure of the metallocene-based composite catalyst may preferably be determined by $^1$H-NMR or X-ray crystallography.

In the metallocene complex represented by the formula (XVI) above, $Cp^R$ is an unsubstituted indenyl or substituted indenyl and has the same meaning as $Cp^R$ in the formula (XV) above. In addition, in the formula (XVI) above, metal $M^2$ is a lanthanoid element, scandium or yttrium and has the same meaning as metal $M^1$ in the formula (XV) above.

The metallocene complex represented by the formula (XVI) above includes a silylamide ligand [—N(SiR$_3$)$_2$]. Each of R groups ($R^E$ to $R^J$ groups) included in the silylamide ligand is independently an alkyl group having 1 to 3 carbon atoms or a hydrogen atom. Also, at least one of $R^E$ to $R^J$ is preferably a hydrogen atom. With at least one of $R^E$ to $R^J$ representing a hydrogen atom, the catalyst can be synthesized with ease Additionally, a methyl group is preferred as the alkyl group.

The metallocene complex represented by the formula (XVI) above further contains 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same or different from each other.

In addition, the metallocene complex represented by the formula (XVI) may be present as a monomer or as a dimer or higher-order multimer.

On the other hand, the organic aluminum compound used for generating the above-described metallocene-based composite catalyst is represented by $AlR^K R^L R^M$, where $R^K$ and $R^L$ are independently a univalent hydrocarbon group having 1 to 20 carbon atoms or a hydrogen atom, and $R^M$ is a univalent hydrocarbon group having 1 to 20 carbon atoms, in which $R^M$ may be the same as or different from $R^K$ or $R^L$ above. Here, examples of the univalent hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

Specific examples of the aforementioned organic aluminum compound include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride; among these, preferred are the triethyl aluminum, the triisobutyl aluminum, the diethyl aluminum hydride, and the diisobutyl aluminum hydride. These organic aluminum compounds may be contained alone or in combination of two or more. The content of the organic aluminum compound to be used for generating the metallocene-based composite catalyst is preferably 1-fold mol to 50-fold mol, and more preferably about 10-fold mol, with respect to the metallocene complex.

<Third Polymerization Catalyst Composition>

Preferred examples of the polymerization catalyst composition include the above-described metallocene-based composite catalyst and boron anion. Furthermore, this polymerization catalyst composition preferably includes another component such as a co-catalyst, which is contained in a general polymerization catalyst composition containing a metallocene-based catalyst. Here, the third polymerization catalyst composition is also referred to as a two-component catalyst, which has the metallocene-based composite catalyst and boron anion. As is the case with the metallocene-based composite catalyst, the third polymerization catalyst composition further contains boron anion, which allows arbitrary control of the content of each monomer component in the copolymer.

In the third polymerization catalyst composition, specific examples of the boron anion forming the two-component catalyst include a tetravalent boron anion. Examples thereof may include: a tetraphenyl borate, a tetrakis(monofluorophenyl)borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (tripheyl, pentafluorophenyl)borate, a [tris(pentafluorophenyl), phenyl]borate, and a tridecahydride-7,8-dicarbaundecaborate; among these, preferred is the tetrakis(pentafluorophenyl)borate.

The boron anion may be used as an ionic compound combined with cation. Examples of the cation include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation, and specific examples of the tri(substituted phenyl)carbonium cation include a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Of those cations, the N,N-dialkylanilinium cations or the carbonium cations are preferred, and the N,N-dialkylanilinium cations are particularly preferred. Therefore, preferred examples of the ionic compound include a N,N-dimethylanilinium tetrakis(pentafluorophenyl)borate and a triphenylcarbonium tetrakis(pentafluorophenyl)borate. The content of the ionic compound including a boron anion and a cation may preferably be added by 0.1-fold mol to 10-fold mol, and more preferably by about 1-fold mol, with respect to the metallocene-based composite catalyst.

While it is required to use the above-described metallocene-based composite catalyst and the above-described boron anion in the above-described third polymerization catalyst composition, if a boron anion is present in the reaction system in which the metallocene catalyst represented by the formula (XVI) above is reacted with the organic aluminum compound, it is not possible to synthesize the metallocene-based composite catalyst of the formula (XV) above. Accordingly, preparation of the above-described third polymerization catalyst composition requires the metallocene-based composite catalyst to be synthesized in advance and isolated and purified before combined with a boron anion.

Preferred examples of the co-catalyst that can be contained in the third polymerization catalyst composition may include an organic aluminum compound represented by the $AlR^K R^L R^M$, and also include an aluminoxane. The aluminoxane is preferably an alkyl aluminoxane, examples of which include methyl aluminoxane (MAO) and modified methyl aluminoxane. In addition, preferred examples of the modified methyl aluminoxane include MMAO-3A (manufactured by Tosoh Finechem Corporation). These aluminoxanes may be contained alone or in combination of two or more.

In the method of manufacturing the copolymer, as described above, polymerization may be performed using a general coordinated ionic polymerization catalyst similarly to a conventional method of manufacturing a copolymer, except for the use of the above-described polymerization catalyst or polymerization catalyst composition. Here, the method of manufacturing the copolymer can be performed in, for example, either one of the following manners: (1) the components forming the polymerization catalyst composition may be separately provided in the polymerization system including, as monomers, a conjugated diene compound and a non-conjugated olefin other than the conjugated diene compound, to thereby produce the polymerization catalyst composition in the reaction system, or (2) the polymerization catalyst composition prepared in advance may be provided into the polymerization system. Further, the option (2) also includes providing the metallocene complex (active species) activated by the co-catalyst. The amount of the metallocene complex to be contained in the polymerization catalyst composition is preferably set to fall within a range of 0.0001-fold mol to 0.01-fold mol with respect to the total amount of the conjugate diene compound and the non-conjugated olefin other than the conjugate diene compound.

Further, in the method of manufacturing the copolymer, a terminator such as methanol, ethanol or isopropanol may be used to stop the polymerization.

In the method of manufacturing the copolymer, the polymerization reaction of the conjugated diene compound and the non-conjugated olefin may preferably be performed in an inert gas atmosphere, and preferably in nitrogen or argon atmosphere. The polymerization temperature of the polymerization reaction is not particularly limited, and preferably in a range of, for example, −100° C. to 200° C., and may also be set to temperatures around room temperature. An increase in polymerization temperature may reduce the cis-1,4-selectivity in the polymerization reaction. The polymerization reaction is preferably performed under pressure in a range of 0.1 MPa to 10.0 MPa so as to allow a conjugated diene compound and a non-conjugated olefin to be sufficiently introduced into the polymerization system. Further, the reaction time of the polymerization reaction is not particularly limited, and may preferably be in a range of, for example, 1 second to 10 days, which may be selected as appropriate depending on the conditions such as the type of monomers to be polymerized, type of catalyst and polymerization temperature.

In the aforementioned method of manufacturing the copolymer, when the conjugated diene compound is polymerized with the non-conjugated olefin other than the conjugated diene compound, the pressure of the non-conjugated olefin is preferably in the range of 0.1 MPa to 10 MPa. If the pressure of the non-conjugated olefin is 0.1 MPa or more, it is possible to efficiently introduce the non-conjugated olefin into the reaction mixture. In addition, if the pressure of the non-conjugated olefin is excessively high, the effect attained by efficient introduction of the non-conjugated olefin reaches a peak. Therefore, the pressure of the non-conjugated olefin is preferably 10 MPa or less.

According to the above-described method of manufacturing the copolymer, in polymerizing the conjugated diene compound and a non-conjugated olefin other than the conjugated diene compound, the concentration of the conjugated diene compound (mol/L) and the concentration of the non-conjugated olefin (mol/L) at the start of copolymerization preferably satisfy the following relation: concentration of non-conjugated olefin/concentration of conjugated diene compound ≥1.0;
further preferably satisfy the following relation: concentration of non-conjugated olefin/concentration of conjugated diene compound ≥1.3;
and still further preferably satisfy the following relation: concentration of non-conjugated olefin/concentration of conjugated diene compound ≥1.7.
The ratio of the concentration of the non-conjugated olefin to the concentration of the conjugated diene compound is defined to be at least 1, to thereby efficiently introduce the non-conjugated olefin into the reaction mixture.

In addition, even without using the above-described first polymerization catalyst composition or second polymerization catalyst composition, i.e., even when a normal coordinated ionic polymerization catalyst is used, the above-described copolymer may be manufactured by adjusting the way monomers are fed into the polymerization system. Specifically, a second method of manufacturing the above-described copolymer has a feature in that charging of a conjugated diene compound is controlled in the presence of a non-conjugated olefin so as to organize the chain structure of the copolymer, to thereby control the arrangement of monomer units in the copolymer. As used herein, the term "polymerization system" refers to the location where a conjugated diene compound and a non-conjugated olefin are copolymerized, and specific examples thereof include a reaction container.

Charging of a conjugated diene compound may be performed by using either continuous charging or separate charging, and furthermore, a combination of both. As used herein, the continuous charging refers to, for example, adding a conjugated diene compound at a certain addition rate for a certain period.

Specifically, the concentration ratio of monomers in the polymerization system may be controlled by separate or continuous charging of a conjugated diene compound into a polymerization system for copolymerizing a conjugated diene compound and a non-conjugated olefin. This allows structural characterization of the chain structure (i.e., the arrangement of monomer units) in the resulting copolymer. Further, a conjugated diene compound may be charged into the polymerization system in the presence of a non-conjugated olefin, suppressing generation of homopolymer of the conjugated diene compound. The charging of the conjugated diene compound may be performed after the initiation of the polymerization of the non-conjugated olefin.

For example, if the above-described copolymer is manufactured by using the second method of manufacturing the copolymer according to the present invention, it is effective to continuously charge a conjugated diene compound in the presence of a non-conjugated olefin into the polymerization system in which polymerization of the non-conjugated olefin has been initiated in advance. It is particularly effective to repeat the following operation at least twice when a multi-block copolymer is manufactured by using the second method of manufacturing the copolymer: polymerize a non-conjugated olefin in the polymerization system; and then continuously charging a conjugated diene compound into the polymerization system in the presence of the non-conjugated olefin.

The aforementioned second manufacturing method is not particularly limited as long as the way of charging monomers into a polymerization system is specified as described above, and an arbitrary polymerization method may be employed including, for example, solution polymerization, suspension polymerization, liquid phase bulk polymerization, emulsion polymerization, vapor phase polymerization, and solid state polymerization. Further, the aforementioned second manufacturing method may be performed in a similar manner to the first manufacturing method to copolymerize a conjugated diene compound and a non-conjugated olefin as monomers, except in that the way of charging monomers into the polymerization system is specified as described above.

In the aforementioned second manufacturing method, it is necessary to control the way of charging a conjugated diene compound; specifically, it is preferred to control how much and how many times a conjugated diene compound should be charged. Examples of the method of controlling the introduction of the conjugated diene compound may include, but not limited to: a controlling method based on a computer program or the like; and an analog control method with the use of a timer or the like. Further, as described above, the way of charging a conjugated diene compound is not particularly limited, including continuous charging and separate charging. In the case of separate charging of a conjugated diene compound, as for the number of times to charge the conjugated diene compound, one to five times are preferred, although not particularly limited. If the conjugated diene compound is charged too many times, it may be difficult to distinguish a block copolymer from a random copolymer.

Further, the aforementioned second manufacturing method requires the presence of a non-conjugated olefin in the polymerization system at the time of charging a conjugated diene compound into the polymerization system. It is thus preferred to continuously feed a non-conjugated olefin to the polymerization system. In addition, the way of feeding a non-conjugated olefin is not particularly limited.

<Conjugated Diene-Based Polymer (B)>

The rubber composition of the present invention contains the conjugated diene-based polymer (B). As used herein, the conjugated diene-based polymer (B) represents a polymer that does not contain a non-conjugated olefin as a monomer unit component (part of the copolymer), examples of which preferably include diene-based rubbers such as natural rubber, butadiene rubber, isoprene rubber and chloroprene rubber. These examples may be used alone or in combination of two or more.

Among these, at least one selected from the group consisting of natural rubber, isoprene rubber, butadiene rubber and styrene-butadiene rubber is preferable in the sense that it may offer good compatibility with a non-conjugated diene compound/non-conjugated olefin copolymer (C) containing an ethylene-propylene-diene rubber as described later, and provide improved fracture resistance and crack growth resistance.

<Non-Conjugated Diene Compound/Non-Conjugated Olefin Copolymer (C)>

The rubber composition of the present invention contains a non-conjugated diene compound/non-conjugated olefin copolymer (C) containing an ethylene-propylene-diene rubber (EPDM). Excellent weather resistance may be provided by the EPDM contained in the non-conjugated diene compound/non-conjugated olefin copolymer (C).

The non-conjugated diene compound/non-conjugated olefin copolymer (C) represents a copolymer of a non-conjugated diene compound and a non-conjugated olefin, including a non-conjugated olefin as a monomer unit component in the copolymer. Further, the diene content of the non-conjugated diene compound/non-conjugated olefin copolymer (C) is 10% or less.

As used herein, the EPDM contained in the non-conjugated diene compound/non-conjugated olefin copolymer (C) is obtained by introducing a small amount of the third component into an ethylene propylene rubber (EPM), a copolymer of ethylene and propylene, so that a double bond is formed in the main chain. There are a variety of synthetic rubbers having different types of the third components in different amounts, typically including ethylidenenorbornene (ENB), 1,4-hexadiene (1,4-HD) and dicyclopentadiene (DCP). The EPDM is featured in excellent weather resistance as described above, as well as in excellent aging resistance, cold resistance and solvent resistance.

In addition, the non-conjugated diene compound/non-conjugated olefin copolymer (C) preferably contains the EPDM by at least 10 mol %. This is because there is a possibility that the content of less than 10 mass % is too small to maintain sufficient weather resistance.

It should be noted that other conditions of the non-conjugated diene compound/non-conjugated olefin copolymer (C) (such as a conjugated diene compound, a non-conjugated olefin copolymer other than the EPDM and the method of manufacture) are the same as those of the conjugated diene compound/non-conjugated olefin copolymer (A).

<Mass Ratio>

A mass ratio of the conjugated diene compound/non-conjugated olefin copolymer (A) to the conjugated diene-based polymer (B) to the non-conjugated diene compound/non-conjugated olefin copolymer (C) is not particularly limited and may be selected as appropriate depending on the intended use. The mass ratio is preferably 10:80:10 to 60:10:30 in the sense that it may balance weather resistance, fracture resistance and workability. If the proportion of the conjugated diene compound/non-conjugated olefin copolymer (A) is less than 10, the effect of compatibilization may not be sufficiently obtained; if the proportion of the non-conjugated diene compound/non-conjugated olefin copolymer (C) is less than 10, the effect of weather resistance may not be sufficiently achieved; or if the proportion of the non-conjugated diene compound/non-conjugated olefin copolymer (C) is more than 30, the effect of crack growth resistance may not be sufficiently provided.

<Rubber Components>

Rubber components are not particularly limited and may be selected as appropriate depending on the application thereof. Examples thereof include the conjugated diene compound/non-conjugated olefin copolymer (A), the conjugated diene-based polymer (B) and the non-conjugated diene compound/non-conjugated olefin copolymer (C), as well as other rubber components. The other rubber components include, for example, butyl rubber, halogenated butyl rubber, polysulfide rubber, silicone rubber, fluoro rubber, and urethane rubber. The other rubber components may be used alone or in combination of two or more.

In addition, the content of the conjugated diene compound/non-conjugated olefin copolymer (A) per 100 parts by mass of the aforementioned rubber component (including the conjugated diene compound/non-conjugated olefin copolymer (A), the conjugated diene-based polymer (B) and the non-conjugated diene compound/non-conjugated olefin copolymer (C)) is not particularly limited, and may be selected as appropriate depending on the application thereof. This content is preferably 10 parts by mass to 90 parts by mass, and more preferably 25 parts by mass to 75 parts by mass.

If the content of the conjugated diene compound/non-conjugated olefin copolymer per 100 parts by mass of the rubber component is less than 10 parts by mass, weather resistance may be reduced, while if the content is more than 90 parts by mass, fracture resistance and workability may be deteriorated.

In contrast, if the content of the conjugated diene compound/non-conjugated olefin copolymer (A) per 100 parts by mass of the rubber component is in the above-described more preferred range, this is advantageous in terms of balancing performance requirements.

The content of the conjugated diene-based polymer (B) per 100 parts by mass of the rubber component is not particularly limited, and may be selected as appropriate depending on the application thereof. This content is preferably 90 parts by mass to 10 parts by mass, and more preferably 75 parts by mass to 25 parts by mass.

If the content of the conjugated diene-based polymer per 100 parts by mass of the rubber component is less than 10 parts by mass, fracture resistance and workability may be deteriorated, while the content is more than 90 parts by mass, weather resistance may be reduced. In contrast, if the content of the conjugated diene-based polymer per 100 parts by mass of the rubber component is in the above-described more preferred range, this is advantageous in terms of balancing performance requirements.

The content of the non-conjugated diene compound/non-conjugated olefin copolymer (C) per 100 parts by mass of the rubber component is not particularly limited, and may be selected as appropriate depending on the application thereof. This content is preferably 10 parts by mass to 30 parts by mass. If the content of the non-conjugated diene compound/non-conjugated olefin copolymer (C) per 100 parts by mass of the rubber component is less than 10 parts by mass, sufficient weather resistance may not be obtained, while if the content is more than 30 parts by mass, sufficient crack growth resistance may not be obtained. In contrast, if the content of the non-conjugated diene compound/non-conjugated olefin copolymer (C) per 100 parts by mass of the rubber component is in the above-described more preferred range, this is advantageous in terms of weather resistance.

<Reinforcing Filler>

The rubber composition of the present invention may be mixed with a reinforcing filler as necessary. The reinforcing filler is not limited to any particular type, and any type of reinforcing filler may be used that may achieve the desired reinforcing effect. Examples thereof include carbon black and inorganic fillers.

The content of the reinforcing filler is not particularly limited, and may be selected as appropriate depending on the application thereof. The preferred content thereof is 5 parts by mass to 200 parts by mass per 100 parts by mass of the rubber component.

If the content of the reinforcing filler is less than 5 parts by mass, there may not be much of a reinforcing effect attained by containing the reinforcing filler. Alternatively, if the content is more than 200 parts by mass, mixture of the reinforcing filler into the rubber component tends to fail and the resulting rubber composition may have lower performance.

When carbon black is used as the reinforcing filler, the type of carbon black may be selected as appropriate depending on the application thereof and examples thereof include FEF, GPF, SRF, HAF, N339, IISAF, ISAF, and SAF. These examples may be used alone or in combination of two or more.

The nitrogen adsorption specific surface area ($N_2SA$; according to JIS K6217-2:2001) of the carbon black is not particularly limited and may be selected as appropriate depending on the application thereof. The carbon black preferably has a nitrogen adsorption specific surface area of 20 $m^2/g$ to 100 $m^2/g$, and more preferably 35 $m^2/g$ to 80 $m^2/g$. If the carbon black has a nitrogen adsorption specific surface area ($N_2SA$) of less than 20 $m^2/g$, the resulting rubber has lower durability, resulting in insufficient crack growth resistance. Alternatively, if the carbon black has a nitrogen adsorption specific surface area of more than 100 $m^2/g$, low loss properties may be degraded and working efficiency may be reduced. It should be noted that the nitrogen adsorption specific surface area ($N_2SA$) may be measured in accordance with, for example, JIS K6217-2:2001.

The content of the carbon black per 100 parts by mass of the rubber component is not particularly limited, and may be selected as appropriate depending on the application thereof. This content is preferably 10 parts by mass to 70 parts by mass, and more preferably 20 parts by mass to 60 parts by mass. If the content of the carbon black is less than 10 parts by mass, the resulting rubber composition may have worse fracture resistant properties due to insufficient reinforcing performance, while if the content is more than 70 parts by mass, the resulting rubber composition may have worse workability and low loss properties. In contrast, the content of the carbon black is in the above-described more preferred range, this is advantageous in terms of balancing performance requirements.

When an inorganic filler is used as the reinforcing filler, the type of inorganic filler is not particularly limited, and may be selected as appropriate depending on the application thereof. Examples thereof include silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, and barium sulfate. These examples may be used alone or in combination of two or more. In using an inorganic filler, a silane coupling agent may also be used as appropriate.

<Crosslinking Agent>

The rubber composition of the present invention may be mixed with a crosslinking agent as necessary. The crosslinking agent is not particularly limited and may be selected as appropriate depending on the application thereof. Examples thereof include a sulfur-based crosslinking agent, an organic peroxide-based crosslinking agent, an inorganic crosslinking agent, a polyamine crosslinking agent, a resin crosslinking agent, a sulfur compound-based crosslinking agent, oxime-nitrosamine-based crosslinking agent, and sulfur. Among these, preferred as a rubber composition for tires is the sulfur-based crosslinking agent.

The content of the crosslinking agent is not particularly limited and may also be selected as appropriate depending on the application thereof. For example, the content thereof is preferably 0.1 parts by mass to 20 parts by mass per 100 parts by mass of the rubber component. This is because the crosslinking agent added by less than 0.1 parts by mass in content may hardly develop crosslinking, whereas the content exceeding 20 parts by mass tends to develop crosslinking by part of the crosslinking agent during the kneading, which may impair the physical property of the vulcanizate.

<Other Components>

Other than the above, a vulcanization accelerator may also be contained. Examples of the vulcanization accelerator include: guanidine-based compounds, aldehyde-amine-based compounds, aldehyde-ammonia-based compounds, thiazole-based compounds, sulfenamide-based compounds, thiourea-based compounds, thiuram-based compounds, dethiocarbamate-based compounds, and xanthate-based compounds.

Further, if necessary, any known agent such as a reinforcing agent, a softening agent, a filler, a co-agent, a colorant, a flame retardant, a lubricant, a foaming agent, a plasticizer, a processing aid, an antioxidant, an age resister, an anti-scorch agent, an ultraviolet rays protecting agent, an antistatic agent, a color protecting agent, and other compounding agents may be used depending on the intended use thereof.

(Crosslinked Rubber Composition)

A crosslinked rubber composition according to the present invention is obtained by crosslinking the rubber composition of the present invention. The conditions of the crosslinking conditions are not particularly limited, and may be selected as appropriate depending on the application thereof. Conditions of temperature and heating time for the crosslinking may preferably be in the range of 120° C. to 200° C. for 1 minute to 900 minutes.

(Tire)

A tire according to the present invention is manufactured by using the rubber composition of the present invention or the crosslinked rubber composition of the present invention.

The rubber composition of the present invention or the crosslinked rubber composition of the present invention may be applied to any portion of the tire without limitation, which may be selected as appropriate depending on the application thereof. For example, the rubber composition or the crosslinked rubber composition according to the present invention may be used in a tread, a base tread, a sidewall, a side reinforcing rubber and a bead filler of a tire. Among these, the rubber composition and the crosslinked rubber composition according to the present invention is preferably used in the sidewall portion of the tire by virtue of its excellent weather resistance, fracture resistance and crack growth resistance. The tire can be manufactured by a conventional method. For example, a carcass layer, a belt layer, a tread layer, which are composed of unvulcanized rubber, and other members used for the production of usual tires are successively laminated on a tire molding drum, then the drum is withdrawn to obtain a green tire. Thereafter, the green tire is heated and vulcanized in accordance with an ordinary method, to thereby obtain a desired tire (e.g., a pneumatic tire).

(Applications Other than Tires)

The rubber composition of the present invention or the crosslinked rubber composition of the present invention may be used for other applications than tires, such as anti-vibration rubber, seismic isolation rubber, a belt (conveyor belt), a rubber crawler, various types of hoses, and moran.

EXAMPLES

The present invention will be described in more detail below with reference to examples thereof. However, the present invention is no way limited to the disclosed examples.

Preparation Example 1

Preparation of Butadiene-Ethylene Copolymer (EBR1)

A toluene solution of 2,000 g containing 120 g (2.22 mol) of 1,3-butadiene was added to a 4 L stainless reactor that had been sufficiently dried, and then ethylene was introduced thereto at 1.72 MPa. Meanwhile, in a glovebox under a nitrogen atmosphere, 28.5 mmol of bis(2-phenylindenyl)gadolinium bis(dimethylsilylamide) [(2-PhC$_9$H$_6$)$_2$GdN(SiHMe$_2$)$_2$], 28.5 μmol of dimethylanilinium tetrakis(pentafluorophenyl)borate [Me$_2$NHPhB(C$_6$F$_5$)$_4$], and 2.00 mmol of diisobutylaluminum hydride were provided in a glass container, which was dissolved into 40 mL of toluene, to thereby obtain a catalyst solution. After that, the catalyst solution was taken out from the glovebox and added by 25.0 μmol of gadolinium equivalent to the monomer solution, which was then subjected to polymerization at 50° C. for 90 minutes. After the polymerization, 5 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a polymer. The yield of the copolymer EBR1 thus obtained was 98 g. It was determined that the copolymer EBR1 has a diene content of 91 mol %, an ethylene content of 9 mol %, a weight-average molecular weight (Mw) of 358,000, and a molecular weight distribution (Mw/Mn) of 2.5.

Preparation Example 2

Preparation of Butadiene-Ethylene Copolymer (EBR2)

A toluene solution of 2,000 g containing 230 g (4.26 mol) of 1,3-butadiene was added to a 4 L stainless reactor that had been sufficiently dried, and then ethylene was introduced thereto at 1.72 MPa. Meanwhile, in a glovebox under a nitrogen atmosphere, 145 μmol of bis(2-phenylindenyl)gadolinium bis(dimethylsilylamide) [(2-PhC$_9$H$_6$)$_2$GdN(SiHMe$_2$)$_2$], 145 mmol of dimethylanilinium tetrakis(pentafluorophenyl)borate [Me$_2$NHPhB(C$_6$F$_5$)$_4$], and 2.9 mmol of diisobutylaluminum hydride were provided in a glass container, which was dissolved into 100 mL of toluene, to thereby obtain a catalyst solution. After that, the catalyst solution was taken out from the glovebox and added by 142 μmol of gadolinium equivalent to the monomer solution, which was then subjected to polymerization at 60° C. for 60 minutes. After the polymerization, 5 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a polymer. The yield of the copolymer EBR2 thus obtained was 248 g. It was determined that the copolymer EBR2 has a diene content of 62 mol %, an ethylene content of 38 mol %, a weight-average molecular weight (Mw) of 449,000, and a molecular weight distribution (Mw/Mn) of 4.4.

Preparation Example 3

Preparation of Butadiene-Ethylene Copolymer (EBR3)

A toluene solution of 200 mL containing 9.36 g (0.173 mol) of 1,3-butadiene was added to a 400 mL pressure-resistant grass reactor that had been sufficiently dried, and then ethylene was introduced thereto at 0.6 MPa. Meanwhile, in a glovebox under a nitrogen atmosphere, 21.0 μmol of (2-MeC$_9$H$_6$)$_2$Sc(MeAlMe$_3$), 21.0 μmol of triphenylcarbonium tetrakis(pentafluorophenyl)borate (Ph$_3$CB(C$_6$F$_5$)$_4$), and 0.25 mmol of triisobutyl aluminum were provided in a glass container, which was dissolved into 5 mL of toluene, to thereby obtain a catalyst solution. After that, the catalyst solution was taken out from the glovebox and added to the monomer solution, and subjected to polymerization at 25° C. for 50 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a polymer. The yield of the copolymer EBR3 thus obtained was 9.30 g. It was determined that the copolymer EBR3 has a diene content of 95 mol %, an ethylene content of 5 mol %, a weight-average molecular weight (Mw) of 363,000, and a molecular weight distribution (Mw/Mn) of 2.4.

Preparation Example 4

Preparation of Ethylene-Butadiene Copolymer (EBR4)

A toluene solution of 2,000 g containing 80 g (1.48 mol) of 1,3-butadiene was added to a 4 L stainless reactor that had been sufficiently dried, and then ethylene was introduced thereto at 1.72 MPa. Meanwhile, in a glovebox under a nitrogen atmosphere, 28.5 mmol of bis(2-phenylindenyl)gadolinium bis(dimethylsilylamide) [(2-PhC$_9$H$_6$)$_2$GdN(SiHMe$_2$)$_2$], 28.5 μmol of dimethylanilinium tetrakis(pentafluorophenyl)borate [Me$_2$NHPhB(C$_6$F$_5$)$_4$], and 2.00 mmol of diisobutylaluminum hydride were provided in a glass container, which was dissolved into 40 mL of toluene, to thereby obtain a catalyst solution. After that, the catalyst solution was taken out from the glovebox and added by 25.0 μmol of gadolinium equivalent to the monomer solution, which was then subjected to polymerization at 80° C. for 90 minutes. After the polymerization, 5 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer. The yield of the copolymer EBR4 thus obtained was 78 g. It was determined that the copolymer EBR4 has a diene content of 38 mol %, an ethylene content of 62 mol %, a weight-average molecular weight (Mw) of 281,000, and a molecular weight distribution (Mw/Mn) of 2.4.

Preparation Example 5

Preparation of Propylene-Butadiene Copolymer (PBR)

Added to a glass bottle with a capacity of 200 mL sealed with a rubber stopper after drying and nitrogen substitution were 0.05 mol of VOCl$_3$ (oxovanadium trichloride), 0.10 mol of neopentyl alcohol, and toluene. Then, hydrochloric acid generated while bubbling with nitrogen was removed through a needle to obtain a toluene solution of dineopentoxy oxovanadium chloride.

Added to a glass bottle with a capacity of approximately 1 L sealed with a rubber stopper after drying and nitrogen substitution was 250 g of a toluene solution (17.5 wt %) of dried and purified butadiene. This glass bottle was then cooled to −78° C., to which 50 g of propylene gas was supplied. Then, 2.81 mmol of triisobutyl aluminum (1 mol/L of an n-hexane solution) was added to the glass bottle, which was then stirred and allowed to stand for about 10 minutes. Subsequently, added to the glass bottle was 0.47 mmol of the vanadium solution prepared as described above to initiate polymerization reaction, which was allowed to proceed at −78° C. for 4 hours. Then, added to the glass bottle at 50° C. was 2 mL of a 5% solution of an age resister, 2,2'-methylene-bis(4-ethyl-6-t-butylphenol) (NS-5), in isopropanol to terminate the reaction. Further, the product was reprecipitated in isopropanol containing traces of NS-5 and dried using a drum to obtain a propylene-butadiene copolymer (PBR) corresponding to the conjugated diene compound/non-conjugated olefin copolymer (A). The yield of the copolymer PBR thus obtained was about 70 mass %. It was determined that the copolymer has a diene content of 50 mol %, a weight-average molecular weight (Mw) of 250,000, and a molecular weight distribution (Mw/Mn) of 2.0.

Preparation Example 6

Preparation of Butene-Butadiene Copolymer (BBR)

Added to a glass bottle with a capacity of 200 ml sealed with a rubber stopper after drying and nitrogen substitution were 0.05 mol of VOCl$_3$ (oxovanadium trichloride), 0.10 mol of neopentyl alcohol, and toluene. Then, hydrochloric acid generated while bubbling with nitrogen was removed through a needle to obtain a toluene solution of dineopentoxy oxovanadium chloride.

Added to a glass bottle with a capacity of approximately 1 L sealed with a rubber stopper after drying and nitrogen substitution was 250 g of a toluene solution (17.5 wt %) of dried and purified butadiene. This glass bottle was then cooled to −78° C., to which 66 g of butene gas was supplied. Then, 2.81 mmol of triisobutyl aluminum (1 mol/L of an n-hexane solution) was added to the glass bottle, which was then stirred and allowed to stand for about 10 minutes. Subsequently, added to the glass bottle was 0.47 mmol of the vanadium solution prepared as described above to initiate polymerization reaction, which was allowed to proceed at −78° C. for 12 hours. Then, added to the glass bottle at 50° C. was 2 mL of a 5% solution of an age resister, 2,2'-methylene-bis(4-ethyl-6-t-butylphenol) (NS-5), in isopropanol to terminate the reaction. Further, the product was reprecipitated in isopropanol containing traces of NS-5 and dried using a drum to obtain a butene-butadiene copolymer (BBR) corresponding to the conjugated diene compound/non-conjugated olefin copolymer (A). The yield of the copolymer BBR thus obtained was about 65 mass %. It was determined that the copolymer has a diene content of 55 mol %, a butene content of 45 mol %, a weight-average molecular weight (Mw) of 300,000, and a molecular weight distribution (Mw/Mn) of 2.1.

Preparation Example 7

Preparation of Ethylene-Propylene-Butadiene Rubber (EPDM2)

As indicated in Synthesis Example 1 of JP 2000-063639 A, 500 mL of toluene was placed into a glass autoclave having an inner capacity of 1 L that had been subjected to nitrogen substitution to a sufficient degree, and furthermore, the system was saturated in liquid and gas phases with a mixed gas of ethylene at 50 L/h, propylene at 150 L/h and butadiene 20 L/h. Then, a pre-mixed solution of 0.25 mmol of triisobutyl aluminum and 0.006 mmol of triphenylcarbonium tetrakis(pentafluorophenyl)borate was added thereto to initiate polymerization. After the polymerization at 50° C. for 30 minutes, a small amount of isobutanol was added to terminate the polymerization.

The polymer solution thus obtained was added to 1.5 L of methanol containing a small amount of hydrochloric acid to precipitate a polymer. The polymer was washed with methanol and then dried under reduced pressure at 130° C. for 10 hours, and the result was 3.25 g of an ethylene-propylene-butadiene copolymer (EPDM2).

Examples 1 to 7 and Comparative Examples 1 to 6

As samples of the rubber compositions of Examples 1 to 7 and Comparative Examples 1 to 6, rubber compositions formulated as shown in Table 1 were prepared, each containing the conjugated diene compound/non-conjugated olefin copolymer (A), the conjugated diene-based polymer (B) and the non-conjugated diene compound/non-conjugated olefin copolymer (C).

Then, using these rubber composition samples, the compounds shown in "Master Batch" in Table 2 were added to prepare master batches, to which the compounds shown in "Final Batch" in Table 2 were then added to prepare final batches. The final batches thus prepared were subsequently vulcanized at 160° C. for 20 minutes to produce vulcanized rubber samples. As used herein, "phr" in Tables 1 and 2 indicate the proportion per 100 parts by mass of the rubber compositions.

(Evaluation)

The rubber composition samples and the vulcanized rubber samples that were obtained in the aforementioned examples and comparative examples were measured for their compatibility, weather resistance, fracture resistance and crack growth resistance (index) according to the following method.

(1) Compatibility (Haze Value)

The rubber composition samples obtained in the examples and comparative examples were each mixed with polyisoprene, and the mixtures were pressed between PET films at 100° C. A haze meter (manufactured by Nippon Denshoku Industries Co., Ltd.) was used to measure transparency (haze value) of the obtained samples, and the measurements were used as indicator of compatibility. The evaluation results are shown in Table 1.

with a score of 100 representing Comparative Example 2. The results thereof are shown in Table 1. The results are shown in Table 1 as being indexed with a score of 100 representing the result of Comparative Example 2, where larger values indicate better fracture resistance.

(4) Crack Growth Resistance (Constant Strain)

In each of the vulcanized rubber samples obtained in the aforementioned examples and comparative examples, a 0.5-mm crack was given at the central portion of each JIS No. 3 test specimen. Then, fatigue was repetitively applied to each sample at room temperature under a constant strain of 0% to 100%, and the number of times it took to rupture the sample by applying the repetitive fatigue was counted for each sample, based on which evaluation of each sample was performed.

The results are shown in Table 1 as being indexed with a score of 100 representing the result of Comparative Example 2, where larger index values indicate better crack growth resistance (resistance to constant strain).

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|
| EBR1 (phr) | — | — | 30 | — | — | — | — | — | — | — | — | 60 | — |
| EBR2 (phr) | — | 30 | — | — | — | 30 | 30 | — | — | — | — | — | — |
| EBR3 (phr) | 30 | — | — | — | — | — | — | — | — | — | — | — | — |
| EBR4 (phr) | — | — | — | — | — | — | — | 30 | — | — | — | — | — |
| PBR (phr) | — | — | — | 30 | — | — | — | — | — | — | — | — | 60 |
| BBR (phr) | — | — | — | — | 30 | — | — | — | — | — | — | — | — |
| EPDM1 (phr)*1 | 30 | 30 | 30 | 30 | 30 | 30 | 30 | 30 | 60 | — | 60 | — | — |
| EPDM2 (phr) | — | — | — | — | — | — | — | — | — | 60 | — | — | — |
| NR (phr)*2 | 40 | 40 | 40 | 40 | 40 | 20 | — | 40 | 40 | 40 | — | 40 | 40 |
| BR (phr)*3 | — | — | — | — | — | 20 | 40 | — | — | — | 40 | — | — |
| Haze Value (index) | 53 | 58 | 48 | 45 | 42 | 61 | 57 | 40 | 100 | 128 | 95 | 38 | 21 |
| Weather Resistance | Good | Good | Good | Good | Good | Good | Good | Good | Good | Good | Good | Fair | Fair |
| Fracture Resistance (index) | 103 | 101 | 102 | 103 | 100 | 96 | 94 | 80 | 100 | 75 | 71 | 105 | 103 |
| Crack Growth Resistance (index) | 183 | 205 | 195 | 211 | 208 | 181 | 135 | 98 | 100 | 81 | 65 | 91 | 93 |

*1EPDM as a conjugated diene compound/non-conjugated olefin copolymer (C); "EP35" available from JSR; diene content: 8 mol %
*2Natural rubber as a conjugated diene-based polymer (B), #3 available from RSS
*3Butadiene rubber as a conjugated diene-based polymer (B), "BR01" available from JSR It should be noted that haze values are shown in Table 1 as being indexed with a score of 100 representing the result of Comparative Example 2, where lower index values indicate higher compatibility, or better results.

(2) Weather Resistance (Ozone Resistance)

The vulcanized rubber samples that were obtained in the aforementioned examples and comparative examples were measured for their ozone resistance according to JIS K6259. Rectangular test specimens were exposed at 40° C. and ozone concentration of 50 pphm under 30% dynamic stretching. Then, the conditions of the samples after 24 hours were visually examined (for cracks). The results thereof are shown in Table 1.

In Table 1, "Good" indicates "absence of cracks" and "Poor" signifies "presence of cracks."

(3) Fracture Resistance

The vulcanized rubber samples that were obtained in the aforementioned examples and comparative examples were subjected to tension test under JIS K 6251 to measure their tensile strength at break and elongation at break at room temperature. The results thereof are shown as being indexed

TABLE 2

| Master Batch | rubber component | 100.0 |
|---|---|---|
|  | carbon black *4 | 50.0 |
|  | stearic acid (phr) | 2.0 |
|  | age resistor 1 (phr)*5 | 0.5 |
|  | softening agent (phr)*6 | 4.0 |
| Final Batch | zinc oxide (phr) | 3.0 |
|  | age resistor 2 (phr)*7 | 1.0 |
|  | co-agent 1 (phr)*8 | 0.4 |
|  | co-agent 2 (phr)*9 | 0.2 |
|  | sulfur (phr) | 1.4 |

*4SEAST SO (manufactured by Tokai Carbon Co., Ltd.)
*5N-(1,3-dimethylbutyl)-N'-p-phenylenediamine (NOCRAC 6C), manufactured by OUCHI SHINKO CHEMICAL INDUSTRIAL CO., LTD.
*6a mixed resin of C5 and C9 petroleum resins
*72,2,4-trimethyl-N'-phenyl-p-phenylenediamine
*8N-cyclohexyl-2-benzothiazolesulfenamide (NOCCELER CZ-G), manufactured by OUCHI SHINKO CHEMICAL INDUSTRIAL CO., LTD.
*9dibenzothiazyl disulfide (NOCCELER DM-P), manufactured by OUCHI SHINKO CHEMICAL INDUSTRIAL CO., LTD.

It can be seen from the results shown in Table 1 that high compatibility is observed between natural rubber (NR) or butadiene rubber (BR) and ethylene-propylene-diene rubber (EPDM), and that balancing among high weather resistance, high fracture resistance and high crack growth resistance is achieved.

INDUSTRIAL APPLICABILITY

The rubber composition of the present invention is useful in industrial application in the sense that it allows production of a rubber having excellent weather resistance, fracture resistance and crack growth resistance, and can be used generally for elastomer products, in particular, tire sidewall members.

The invention claimed is:

1. A rubber composition comprising:
   a conjugated diene compound/non-conjugated olefin copolymer (A) containing a conjugated diene compound-derived unit by at least 40 mol %;
   a conjugated diene-based polymer (B); and
   a non-conjugated diene compound/non-conjugated olefin copolymer (C) containing an ethylene-propylene-diene rubber.

2. The rubber composition according to claim 1, wherein the conjugated diene compound/non-conjugated olefin copolymer (A) contains an olefin component by 60 mol % or less.

3. The rubber composition according to claim 1, wherein the non-conjugated diene compound/non-conjugated olefin copolymer (C) contains the ethylene-propylene-diene rubber by at least 10 wt %.

4. The rubber composition according to claim 1 further comprising a reinforcing filler (D).

5. The rubber composition according to claim 4, wherein the content of the reinforcing filler (D) is 10 parts by mass to 70 parts by mass per 100 parts by mass of rubber component.

6. The rubber composition according to claim 1, the conjugated diene-based polymer (B) is at least one selected from the group consisting of natural rubber, isoprene rubber, butadiene rubber and styrene-butadiene rubber.

7. The rubber composition according to claim 1, wherein a mass ratio of the conjugated diene compound/non-conjugated olefin copolymer (A) to the conjugated diene-based polymer (B) to the non-conjugated diene compound/non-conjugated olefin copolymer (C) is 10:80:10 to 60:10:30.

8. The rubber composition according to claim 1, wherein the conjugated diene compound/non-conjugated olefin copolymer (A) has a polystyrene-equivalent average-weight molecular weight of 10,000 to 10,000,000.

9. The rubber composition according to claim 1, wherein the conjugated diene compound/non-conjugated olefin copolymer (A) has a molecular weight distribution (Mw/Mn) of 10 or less.

10. The rubber composition according to claim 1, wherein the non-conjugated olefin of the conjugated diene compound/non-conjugated olefin copolymer (A) is an acyclic olefin.

11. The rubber composition according to claim 1, wherein the non-conjugated olefin of the conjugated diene compound/non-conjugated olefin copolymer (A) has 2 to 10 carbon atoms.

12. The rubber composition according to claim 10, wherein the non-conjugated olefin of the conjugated diene compound/non-conjugated olefin copolymer (A) is at least one selected from the group consisting of ethylene, propylene and 1-butene.

13. The rubber composition according to claim 12, wherein the non-conjugated olefin of the conjugated diene compound/non-conjugated olefin copolymer (A) is ethylene.

14. The rubber composition according to claim 1, wherein the conjugated diene compound of the conjugated diene compound/non-conjugated olefin copolymer (A) is at least one selected from the group consisting of 1,3-butadiene and isoprene.

15. The rubber composition according to claim 1 further comprising a crosslinking agent by 0.1 parts by mass to 20 parts by mass per 100 parts by mass of the rubber component.

16. A rubber composition for tire side use using the rubber composition according to claim 1 for tire sidewall members.

17. A crosslinked rubber composition obtained by crosslinking the rubber composition according to claim 1.

18. A tire manufactured by using the rubber composition according to claim 1.

19. The tire according to claim 18, wherein the tire uses the rubber composition for sidewall members thereof.

* * * * *